(12) United States Patent
Wang et al.

(10) Patent No.: US 9,686,081 B2
(45) Date of Patent: Jun. 20, 2017

(54) DETECTING COMPROMISED CERTIFICATE AUTHORITY

(71) Applicant: Cisco Technology, Inc., San Jose, CA (US)

(72) Inventors: Jianxin Wang, Saratoga, CA (US); Hari Shankar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 55 days.

(21) Appl. No.: 14/788,862

(22) Filed: Jul. 1, 2015

(65) Prior Publication Data

US 2017/0005805 A1    Jan. 5, 2017

(51) Int. Cl.
*H04L 29/06* (2006.01)
*H04L 9/32* (2006.01)

(52) U.S. Cl.
CPC .................................. *H04L 9/3263* (2013.01)

(58) Field of Classification Search
CPC .................................................... H04L 9/3263
USPC ......................................................... 713/156
See application file for complete search history.

(56) References Cited

U.S. PATENT DOCUMENTS

| | | | |
|---|---|---|---|
| 7,383,434 B2* | 6/2008 | Wildish | G06Q 30/06 380/282 |
| 7,877,600 B2 | 1/2011 | Qiu et al. | |
| 8,176,336 B1* | 5/2012 | Mao | H04L 9/006 713/189 |
| 8,266,424 B2 | 9/2012 | Negahdar | |
| 8,850,208 B1 | 9/2014 | Parkinson | |
| 9,077,546 B1* | 7/2015 | Rakshit | H04L 9/3265 |
| 2010/0153713 A1* | 6/2010 | Klein | H04L 9/3268 713/158 |
| 2012/0234908 A1* | 9/2012 | Wang | H04L 9/3268 235/375 |
| 2013/0227646 A1* | 8/2013 | Haggerty | H04L 63/0853 726/3 |
| 2014/0331287 A1* | 11/2014 | Barr | H04L 9/3268 726/4 |
| 2014/0337630 A1* | 11/2014 | Kimberly | H04L 9/3281 713/176 |
| 2014/0359281 A1 | 12/2014 | Saboori et al. | |

OTHER PUBLICATIONS

"Certificate Patrol 2.0.14," Add-ons for Firefox, Oct. 14, 2011, retrieved from https://addons.mozilla.org/en-US/firefox/addon/certificate-patrolf, on Apr. 20, 2015, 3 pages.

(Continued)

*Primary Examiner* — Michael S McNally
(74) *Attorney, Agent, or Firm* — Edell, Shapiro & Finnan, LLC (57) ABSTRACT

A computer-implemented method is provided to detect a compromised Certificate Authority (CA). Over time reports are received containing data describing certificate authority certificates captured from messages exchanged between clients and servers. These reports may be received by a central computing entity. Metadata and statistics for certificates contained in the reports are stored. It is determined whether a certificate authority has been compromised based on the metadata and statistics.

20 Claims, 5 Drawing Sheets (56) References Cited

OTHER PUBLICATIONS

"Convergence (SSL)," Wikipedia, the free encyclopedia, Mar. 30, 2015, retrieved from http://en.wikipedia.org/wiki/Convergence_(SSL), on Apr. 20, 2015, 3 pages.
"Perspectives Project," retrieved from http://perspectives-project.org/, on Apr. 20, 2015, 3 pages.
"The EFF SSL Observatory," Electronic Frontier Foundation, retrieved from https://www.eff.org/observatory, on Apr. 20, 2015, 2 pages.
"What is Certificate Transparency?," Certificate Transparency, retrieved from http://www.certificate-transparency.org/what-is-ct, on Apr. 20, 2015, 5 pages.

\* cited by examiner

DETECTING COMPROMISED CERTIFICATE AUTHORITY

TECHNICAL FIELD

The present disclosure relates to certificate authorities.

BACKGROUND

Public key infrastructure is the backbone of Hypertext Transfer Protocol Secure (HTTPS) on the Internet. Although it is widely recognized as complicated and architecturally weak, public key infrastructure is the only infrastructure adopted globally and there is not a viable replacement to date. A certificate authority (CA) is the root of trust in public key infrastructure. Browsers and operating systems build in static lists of trusted root CAs, only updatable through patches, new software installation or manually by the end user. The number of trusted CAs is over 1500 managed by over 50 countries. Compromise of a root CA is disastrous, the most notorious being the Comodo and DigiNotar breaches.

In the DigiNotar breach, the root CA was hacked to issue unauthorized certificates for "high value" sites. Because the DigiNotar CA is a trusted CA, the browser blindly trusts any certificate it issues and does not warn the user. Combined with a compromised Domain Name System (DNS) or a hostile proxy, the user's traffic is open to exploit.

Due to the way a public key infrastructure (PKI) certificate is validated, a compromised CA is difficult to detect, especially for individual end hosts. In the DigiNotar case it took over a month for the first sign of breach to be detected and up to 6 months for major browsers and operating systems to be patched.

DESCRIPTION OF EXAMPLE EMBODIMENTS

Overview

In one embodiment, a computer-implemented method is provided to detect a compromised Certificate Authority (CA). Over time reports are received containing data describing certificate authority certificates captured from messages exchanged between clients and servers. These reports may be received by a central computing entity. Metadata and statistics for certificates contained in the reports are stored. It is determined whether a certificate authority has been compromised based on the metadata and statistics.

Example Embodiments

A system and method are provided to detect a potentially compromised Certificate Authority (CA) even if the CA is trusted by client-server negotiations. This method is not focused on or concerned with an invalid certificate or invalid CA that can be identified by an X.509 validation process. Rather, this method involves identify a "trusted" CA that is actually compromised.

Figure 1:
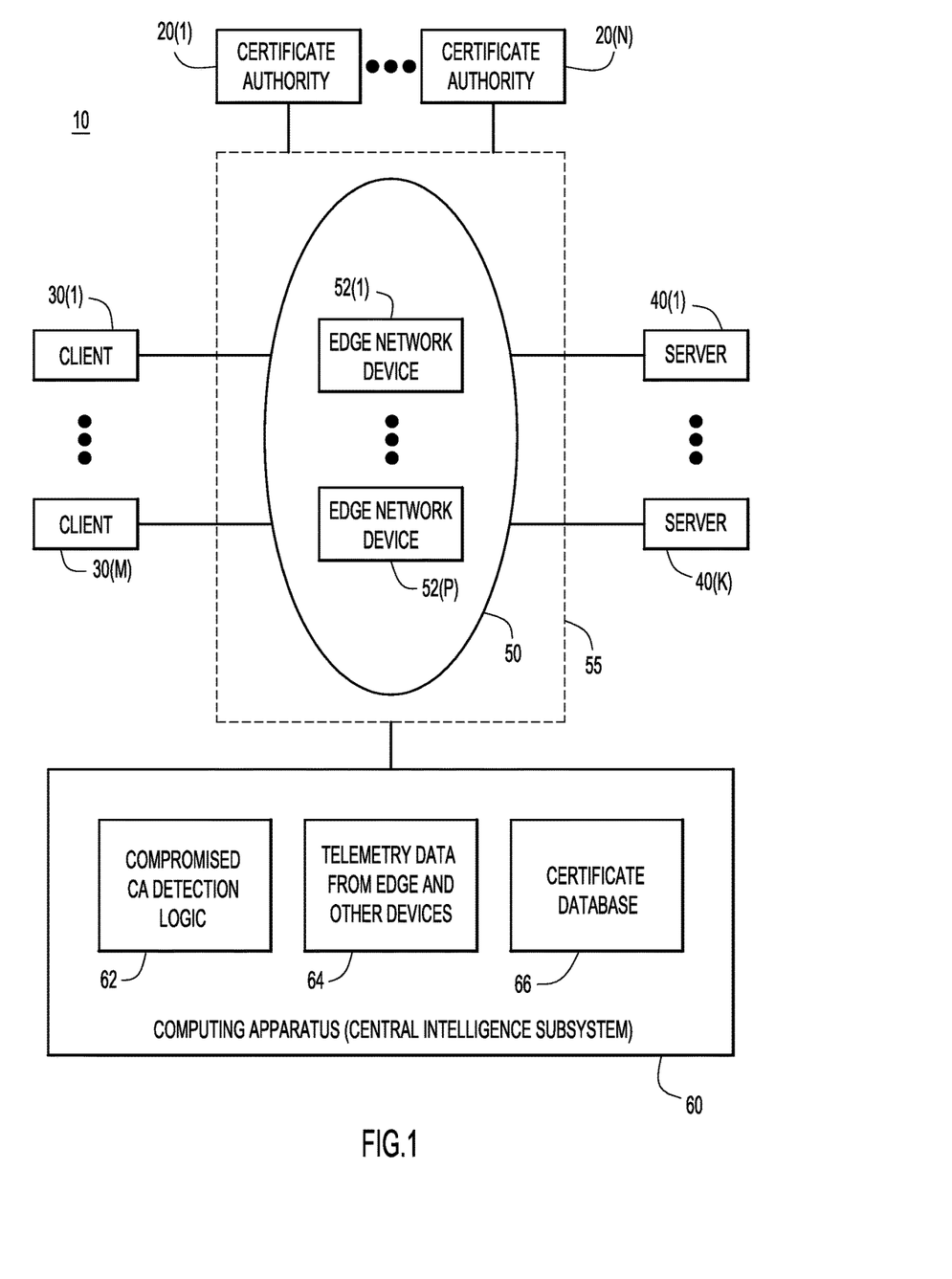
FIG. 1 is a system diagram illustrating a networking environment in which a compromised Certificate Authority (CA) may be detected, according to an example embodiment.

Referring first to FIG. 1, a system 10 is shown that includes a plurality of certificate authorities 20(1)-20(N), a plurality of clients 30(1)-30(M), a plurality of servers 40(1)-40(K), a network 50 and a computing apparatus 60. The servers 40(1)-40(K) may be web servers, application servers, etc. The network 50 includes a plurality of network devices of various types including edge network devices 52(1)-52(P), and may be part of a larger network 55, e.g., the Internet. The computing apparatus 60 may be any device with computing capability to execute software instructions for compromised CA detection logic 62 and storage capability to store telemetry data 64 from one or more of the edge network devices 52(1)-52(P) and other devices. More specifically, the computing apparatus 60 builds a certificate database 66 that the compromised CA detection logic 62 uses to determine whether a CA has been comprised.

The computing apparatus 60 may take the form of a server or one or more applications running in a datacenter/cloud computing system. The computing apparatus 60 performs global correlation of telemetry data from edge devices and/or endpoints (e.g., clients, servers, etc.) to detect suspicious certificates and a compromised CA. The telemetry data contains relevant certificates as seen by an edge network device. The computing apparatus 60 is also referred to herein as a "Central Intelligence" subsystem.

Figure 2:
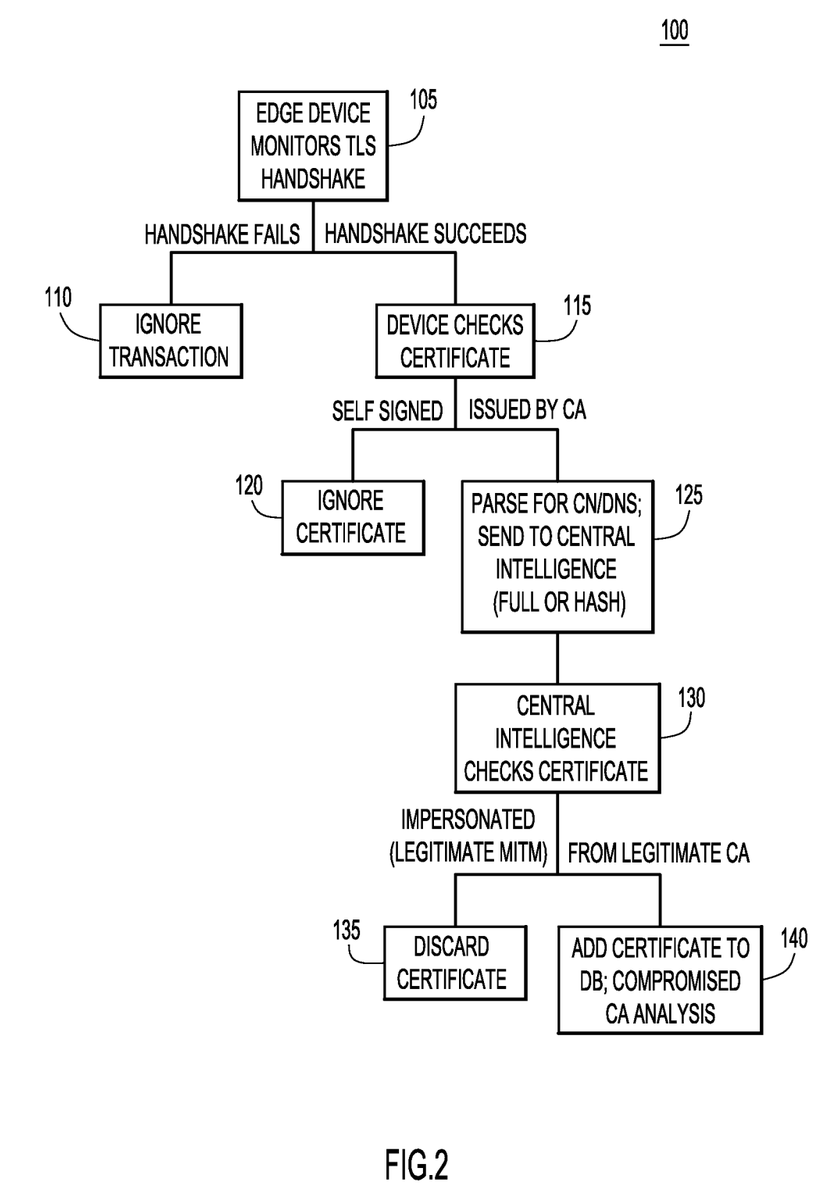
FIG. 2 is a flow diagram illustrating operations to detect a compromised CA, according to an example embodiment.

Reference is now made to FIG. 2, which illustrates a flow diagram for a process according to the operation the system 10 shown in FIG. 1. Continued reference is made to FIG. 1 for purposes of describing FIG. 2.

For a particular website (e.g., one of the servers 40(1)-40(K) in FIG. 1), the X.509 certificate it presents during a Transport Layer Security (TLS) handshake is the same universally in most cases. For example, https://www.google.com is resolved to many Internet Protocol (IP) addresses in different regions and countries, but the certificate is always the same. For example:

United Kingdom: www.google.com (173.194.65.99)
Boxborough, Mass. (U.S.): www.google.com (74.125.228.241)
San Jose, Calif. (U.S): www.google.com (74.125.25.105)
Certificate Data (at the time of writing):
Version: 3 (0x2)
Serial Number: 49:5c:80:2d:63:7e:6a:45
Signature Algorithm: sha1 WithRSAEncryption
Issuer: C=US, O=Google Inc, CN=Google Internet Authority G2
Validity
Not Before: Sep 24 10:48:54 2014 GMT
Not After : Dec 23 00:00:00 2014 GMT
Subject: C=US, ST=California, L=Mountain View, O=Google Inc,
CN=www.google.com
Subject Public Key Info:
Public Key Algorithm: rsaEncryption
RSA Public Key: (2048 bit)
At 105, an edge network or other device monitors a TLS handshake between a client and a server. If the TLS handshake fails, it ignores the transaction as shown at 110. The edge device does not need to act as a main-in-the-middle (MITM) proxy or decrypt the traffic. It only monitors the TLS handshake and retrieves the certificate.

If the TLS handshake succeeds, then at step 115, the edge network or other device checks the certificate. Because the purpose of this method is to detect a compromised CA which is still otherwise trusted by the end hosts (clients and servers), the edge network device need only send validated certificates to the Central Intelligence subsystem. The edge device does not need to validate the certificate on its own, but may rely on the observed completeness of TLS handshake between the client and server. As shown at 120, a self signed certificate is ignored by the device because it does not contain CA information.

An edge network device (firewall, router) sends telemetry data to Central Intelligence subsystem with each unique or repeated relevant certificate it sees. When the edge device determines that a certificate is issued by a CA, then at 125, it parses the certificate for Common Name (CN) or the Domain Name System (DNS) name, and sends this information to the Central Intelligence subsystem. The telemetry data could be sent by Internet edge devices or end hosts (i.e., clients) or collected by cloud services. There is no privacy concern because client identity is not exposed.

For example, for each unique certificate, the device sends the tuple [CN, hash(certificate), entire certificate content] via telemetry. For repeated use of the certificate, the device sends the tuple [CN, Hash(certificate)]. The device may maintain a lightweight [CN, Hash(certificate)] table for its own tracking purposes. In rare cases where the CN field is empty, the device may use the DNS name from the SubAltName field, and continue using that as an identifier of the certificate. The device does not need to exhaust all the DNS names because this step is only to identify unique certificates seen by the device.

Because the full certificate telemetry is sent for a unique certificate, the volume of telemetry reports is much smaller than the number of connections. The edge network or other device may further reduce the volume by downsampling the repeated certificate use ([CN, Hash(certificate)] tuple). Extracting the CN/DNS and computing the hash of the certificate does not add much computation for some devices, e.g., firewall devices, which already inspect the traffic. Moreover, this does not require a proxy or MITM box because the certificate is in the clear (up to the current adopted standards).

At 130, after receiving certificates from the edge network and other devices via telemetry, the Central Intelligence subsystem 60 further eliminates those issued by a (legitimate) man-in-the-middle (MITM) box that impersonates a trusted CA, as shown at 135. The MITM box is "legitimate" because the client has trusted the server certificate and the TLS handshake has completed in step 115. However, those certificates do not carry value for identifying a compromised CA. Instead, they will confuse the evaluation logic described below. To determine whether the certificate is from a MITM box, the Central Intelligence subsystem 60 maintains the same set of trusted root CAs as a client operating system or browser does. The Central Intelligence subsystem 60 validates whether the certificate is from a trusted CA in the same manner as an endpoint, except that it does not have any provisioning information of the proxy CA certificate, and as a result, the Central Intelligence subsystem 60 can filter out MITM box issued certificates. It should be noted that in practice, a legitimate MITM box should not impersonate a trusted CA, but should use its own CA. However, impersonation could happen in theory.

At 140, the Central Intelligence subsystem 60 builds the certificate database 66 indexed by CN from SubName and DNS name from SubAltName of the certificate in order to detect duplicate certificates. Separately for each certificate, metadata and statistics are stored and maintained. Metadata for a certificate includes the certificate Issuer, whether the certificate has been verified by a central authority or not and the result of verification, and date of verification. The statistics for each certificate may include date that the certificate is first reported (first time seen), date that the certificate was last reported, number of reports received for the certificate, and time and geographical distribution of reports received for the certificate.

Figure 3:
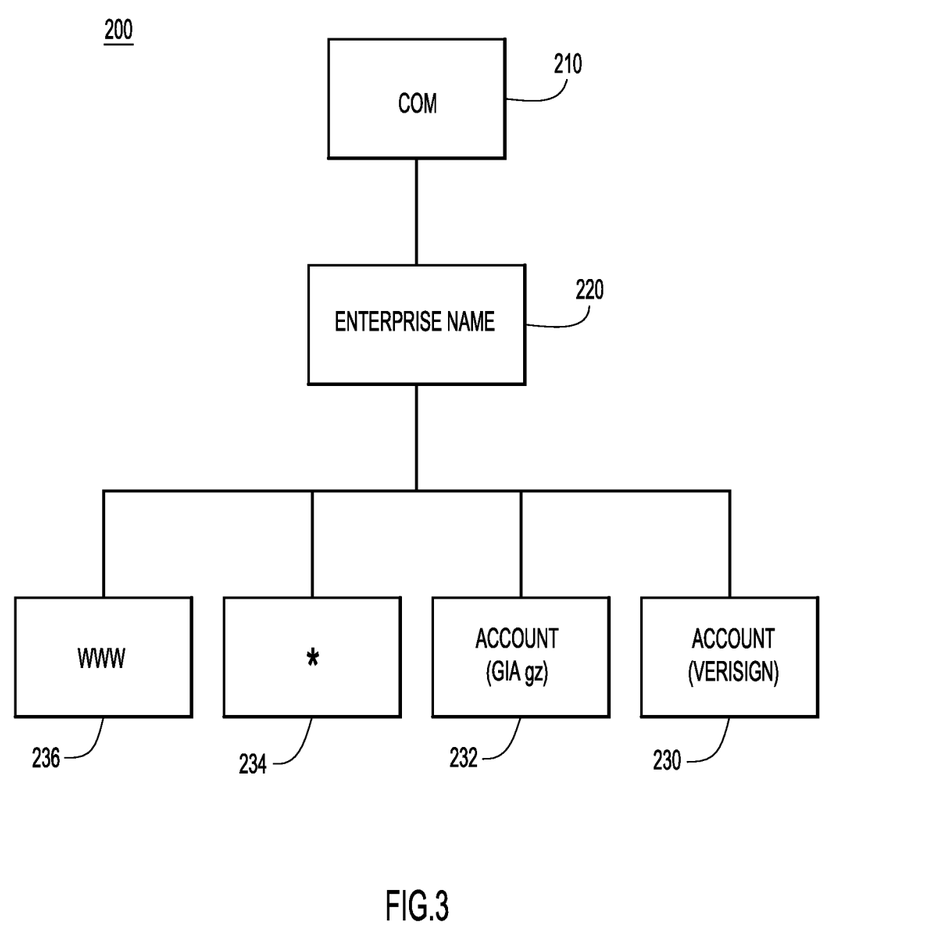
FIG. 3 is a diagram illustrating how certificates associated with subdomains of a particular domain hierarchy can be tracked, according to an example embodiment.

To handle wildcard values of CN/DNS names of certificates, the Central Intelligence subsystem also may implement techniques for overlap of "wild-card" domain names. One possible implementation is to build a tree of domain names going down to subdomains, where each node refers to the list of certificates containing CN/DNS names that match the node either exactly or through wild-card matching. This is shown in FIG. 3, as an example. FIG. 3 shows a tree representation having a top level (".com") 210, an enterprise domain name level 220, and subdomain levels for specific functional subdomains of that enterprise name level, such as a tree node 236 for the "www" subdomain and node 234 for any subdomain variation of the enterprise name. Subdomains that are referred to by multiple certificates are represented by sibling tree nodes, such as nodes 230 and 232 which are both for "account" subdomain, which are the CN names of two different certificates.

When a certificate is detected using an enterprise name and a particular subdomain variation, data is stored to indicate where in the domain name hierarchy the given certificate is detected. In other words, data is stored to indicate, for a given certificate, at which "node" in the tree, such as tree 200, at which the certificate is detected. In this way, statistics can be built for certificates received at each node in a domain name hierarchy.

When a new certificate is reported, its CN (and/or DNS name) is added to the various indexes. In normal cases, the certificate does not match any existing domain names served by other certificates. If there are other certificates for a given domain name served by the newly reported certificate, it is possible that they are all issued by the same CA in which case, it is considered legitimate. Also, it is possible that the other certificates are not actively used anymore. For example, nodes 234 and 236 shown in FIG. 3 overlap, but have the same issuer, and hence are not flagged.

If the Central Intelligence subsystem 60 receives a report about a new certificate for a well established (many reported) CN/DNS, and if other reports still point to the established certificate, and if they are issued by different CAs, it can flag the new certificate has having been issued by a CA that has been compromised, at 140. In other words, when it is determined from received reports that the certificate has been convincingly used in a widespread manner, but someone is seeing a new certificate for the same CN/DNS in a different manner, then that portion of the network where the certificate was seen in a different manner got compromised; in other words, that certificate was issued by a compromised certificate authority. For example, if the established certificate was seen across a wide geographical area for a period of time and then at some point a new certificate for the CN/DNS is reported from only a limited particular geographical area (e.g., a particular country), that may be an indication that a certificate authority that is issuing that certificate in the limited particular geographical area has been compromised. By storing reports for certificates over time, a pattern can be observed and a sense of what is normal for that certificate can be determined. Then, if reports for a particular certificate are outside that pattern/norm, then it is flagged as an anomaly and indication that the particular certificate authority has potentially been compromised. In essence, the analysis at 140 generates an indication/alert when it is determined that there is a CA that is not supposed to be issuing a particular certificate based on detected deviations from a normal pattern from that certificate.

The Central Intelligence subsystem 60 may implement additional logic to further determine whether the CA is indeed compromised. If so, Central Intelligence subsystem 60 may issue a security warning, and for devices with TLS/SSL proxy capability, the Central Intelligence subsystem 60 can send to edge network and other devices an updated list of trusted CAs with the compromised CA removed (whitelist) or a list of compromised CAs (blacklist), so that clients behind the edge network and other devices are protected.

In the case that the certificate is legitimately refreshed (which could occur before the expiration date of the old certificate), the Central Intelligence subsystem 60 should start to see the new certificate exclusively. It can establish the new certificate to replace the old one (still kept for reference) after certain period of time and number of reports.

This system and method presented herein will have best efficacy with global correlation, but will also work if the Central Intelligence subsystem 60 is localized to a particular country or region (for more restrictive privacy concerns). The burden on the Central Intelligence subsystem 60 to collect, store and analyze the data is relatively minimal.

The techniques presented herein can be used alongside other solutions. For example, the Central Intelligence subsystem may make use of monitor/auditors or "notaries" to determine whether a suspicious certificate is indeed compromised or not. Again, the system and method presented herein can identify a compromised CA that is already on the (built-in) list of trusted CAs. The "bad CA" decision is made by the Central Intelligence subsystem based on the distributed data collected on a local/regional basis or a global basis. The "bad CA" detection decision may then be proactively pushed down to a client or proxy. Moreover, no modification needs to be made on a client or a network device to enable the techniques presented herein. Rather, data observed by clients are forwarded to the Central Intelligence subsystem where the decision is made as to whether a bad CA is detected. As a result, the decision is not localized to a particular certificate.

For example, observing enterprisename.com from the U.S. will only see the "authentic" certificates for enterprisename.com. Only a client in a particular country querying a purposely deployed DNS server is directed to a middle box or a fake enterprisename.com server, and the client sees a certificate issued by the compromised DigiNotar CA while DigiNotar is on the client's trusted CA list. The system and method presented herein collect the certificates as seen by that client and report back to the Central Intelligence subsystem to identify the abnormal certificate and potentially compromised CA. The Central Intelligence subsystem does not have to be in any particular country. It could be deployed by a local enterprise. The Central Intelligence subsystem can take feed from any sources, such as "SSL Observatory". In essence, the Central Intelligence subsystem performs "big-data" analytics on the reported certificate data and any metadata associated with the certificate, such as source-IP, time of day, geography, issuer-time, time-to-expiry etc. to find anomalies, and the findings are actionable by pushing down the blacklists to the proxies or other devices in the network.

False positives can be eliminated or reduced by a "majority vote". If the CA changes, after a short period of time, all client reports should point to the new CA. If the report is geographically distributed, the converge time could be shorter. If, after a certain period of time, there are a small number of certificates inconsistent with the reports, there could be a problem with the issuer of those certificates. More sophisticated logic may be used. For example, heuristics can be determined to recognize CA changes or certificate changes, such as by looking for close-to-expiry, new certificates seen in all geographies, and not in one particular country, and independent verification using other schemes now known or hereinafter developed.

Figure 4:
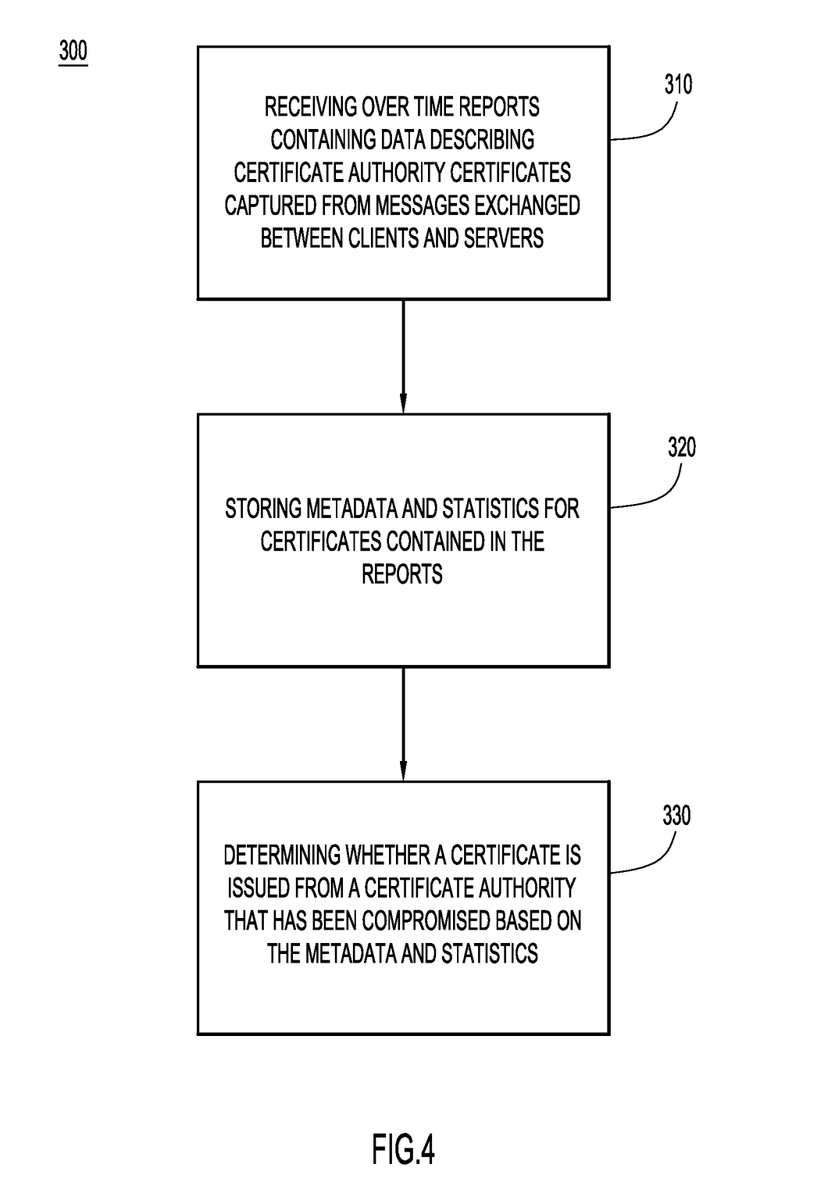
FIG. 4 is a flow chart illustrating, at a high-level, operations performed to detect a compromised CA, according to an example embodiment.

Reference is now made to FIG. 4 for a description of a high-level flow chart of a computer-implemented method 300 according to the techniques presented herein. At 310, reports are received over time, the reports containing data describing Certificate Authority certificates captured from messages exchanged between clients and servers. At 320, metadata and statistics for certificates contained in the reports are stored. At 330, it is determined, based on the stored metadata and statistics, whether a Certificate Authority has been compromised. When a compromised Certificate Authority is detected, information identifying that compromised Certificate Authority may be added or included in a "blacklist" and the Central Intelligence subsystem may send the blacklist to the appropriate devices in the network (e.g., network 55), to clients and/or to servers, so that any other certificates from that Certificate Authority can be flagged as being suspicious and not used.

EXAMPLE USE CASES

Use Case 1: Compromise of DigiNotar Certificate Authority

On the evening of Monday Aug. 29, 2011, it became public knowledge that a rogue *.google.com certificate was presented to a number of Internet users in Iran. This false certificate had been issued by DigiNotar B.V. and was revoked that same evening.

The major details from the textual representation of the compromised certificate are:
Certificate:
  Data:
    Version: 3 (0x2)
    Serial Number:
      05:e2:e6:a4:cd:09:ea:54:d6:65:b0:75.fe:22:a2:56
    Signature Algorithm: sha1WithRSAEncryption
    Issuer:
      emailAddress=info@diginotar.nl
      commonName=DigiNotar Public CA 2025
      organizationName=DigiNotar
      countryName=NL
    Validity
      Not Before: Jul. 10 19:06:30 2011 GMT
      Not After : Jul. 9 19:06:30 2013 GMT
    Subject:
      commonName=*.google.com
      serialNumber=PK000229200002
      localityName=Mountain View
      organizationName=Google Inc
      countryName=US Subject Public Key Info:
   Public Key Algorithm: rsaEncryption
   RSA Public Key: (2048 bit)
     Modulus (2048 bit):
        <truncated>
     Exponent: 65537 (0x10001)
   X509v3 extensions:
     Authority Information Access:
        OCSP—URI:http://validation.diginotar.nl The certificate was a valid certificate signed by "DigiNotar Public CA 2025" from Netherlands and was for the domain *.google.com (as noted by the bolded text above) and was valid for two years between Jul. 10, 2011 until Jul. 9, 2013. Since DigiNotar Root CA, a trusted root CA for all browsers, issued "DigiNotar Public CA 2025", all browsers accepted the new google certificate. Only the Chrome browser, which had pinned Google's own certificate detected the breach and its warning message was reported by a gmail user from Iran.

The analysis also showed that more than 99% of the victim IP addresses originated from the country of Iran.

The root cause of the breach was that the servers of DigiNotar were compromised by hackers who then proceeded to generate fake certificates for many domains including Google domains.

Using the techniques presented herein, this attack would have been solved as follows. The Central Intelligence subsystem would have tracked the various certificates for Google domains and their subdomain, issuer, expiry, and their usage. Until recently, Google had 3 certificates for their various subdomains, for the subdomains 'www', 'account' and '*', each having a specific duration of a few months. When DigiNotar's signed fake certificate was released, it would have shown up as a duplicate certificate for the subdomain '*' for a duration of 2 years, with a different Issuer and found in a localized geography. See the table below.

| Subdomain | Issued By | Duration | Geographies |
|---|---|---|---|
| www.google.com | Google Internet Authority G2 | 3 months | Typical distribution across all geographies |
| account.google.com | Google Internet Authority G2 | 3 months | All geographies |
| *.google.com | Google Internet Authority G2 | 3 months | All geographies |
| *.google.com | DigiNotar Public CA 2025 | 2 years | 99% in IRAN |

The new certificate would have been inserted in the certificate tree hierarchy and its usage would have been tracked by the Central Intelligence subsystem based on telemetry from various Internet edge devices.

The following factors would have triggered suspicion on the new certificate:
1. The new certificate had the same subdomain as another previous '*.google.com' certificate which had not expired yet.
2. The new certificate was signed by a CA authority which had never signed any google certificates before.
3. The new certificate is valid for a longer duration than all existing and historic certificates issued for google domains.
4. The new certificate was seen mostly inside a single country geography.

The combination of the above observations together would increase the suspicion score of the new certificate, flagging it as a potential breached certificate.

Use Case 2: Avoiding False Positives on Normal Certificate Expiry

Typically, certificates of a domain get renewed as they get close to the expiry of the current certificate. In general, no information changes except the rollover of expiration date. Sometimes, the new certificate gets keys regenerated and in other cases, other certificate parameters are modified (such as additional alternate names). In some rare cases, the earlier certificate gets revoked if it is compromised.

The Central Intelligence subsystem tracks certificate revocations and flags the certificates in its databases as revoked. Additionally, when a certificate gets renewed or rekeyed/regenerated, it needs to make sure not to flag the new certificates as suspicious. The following are techniques to ensure that happens:
1. The new certificate is issued by the same CA as the older ones.
2. The older certificate that has the same subdomain as the new one is close to expiry. (within a first particular time period, e.g., within a few days).
3. The new certificate is seen to have the same geographical distribution as the older certificate (within a second particular time period, e.g., within a day of first noticing).
4. The new certificate is seen at all times of the day and not just in specific durations.

The expiring and renewed certificates are likely to have an overlap of valid periods. Certificate service providers have different policies for certificate renewal. For example, one policy may be: "You can purchase and apply SSL renewals during a 90-day renewal window: 60 days prior to the expiration date through 30 days past the expiration date. For example, if your certificate expires June 15, you must purchase and apply the renewal credit between April 15 and July 15."

Sometimes the renewed certificate is an extension of the expiring certificate. In this case, they are issued by the same CA.

The following would be an example of a normal refresh of a certificate:

| Subdomain | Issued By | Valid Since | Valid Till | Geographies |
|---|---|---|---|---|
| *.example.com | Trusted-CA-1 | 2 years ago | 30 days later | Typical distribution across all geographies |
| *.example.com | Trusted-CA-1 | 60 days ago | Next 1 year | All geographies |

In this case, the Central Intelligence subsystem will accept the new certificate (shown in the last row of the table above, and not flag it as suspicious.

Figure 5:
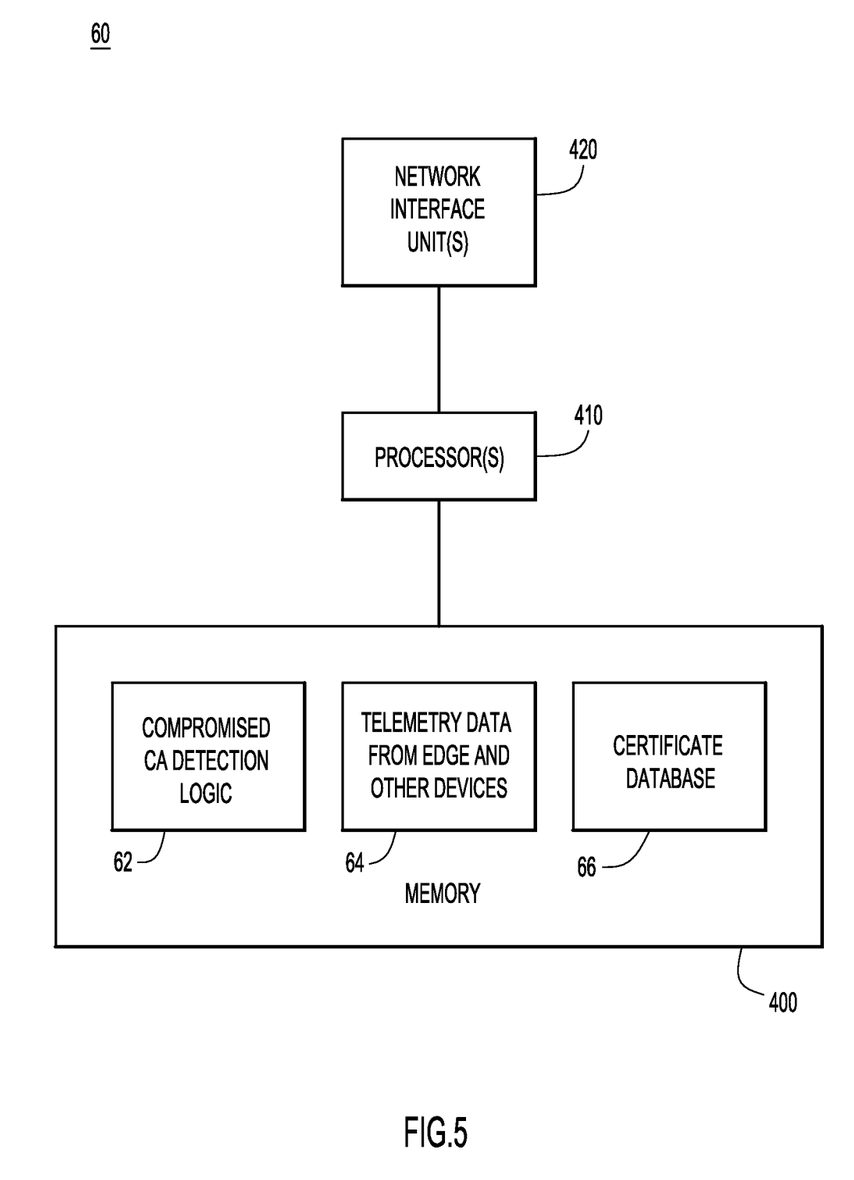
FIG. 5 is a block diagram of a central computing entity that is configured to store reports for certificates, and to detect a compromised CA, according to an example embodiment.

Turning now to FIG. 5, a more detailed block diagram is shown of the Central Intelligence subsystem 60. In one form, the Central Intelligence subsystem 60 is a server computer (or multiple servers) that includes a memory 400, one or more processors 410 and one or more network interface units 420. The memory 400 may include read only memory (ROM), random access memory (RAM), magnetic disk storage media devices, optical storage media devices, flash memory devices, electrical, optical, or other physical/ tangible memory storage devices. Thus, in general, the memory 400 may comprise one or more tangible (non-transitory) computer readable storage media (e.g., a memory device) encoded with software comprising computer executable instructions and when the software is executed (by the processor 410) it is operable to perform the operations described herein, in connection with FIGS. 1-4, when executing the software stored in memory 400. The processor 410 may be a microprocessor or microcomputer, for example, and the network interface unit 520 may include one or more network interface cards that enable network communications. The memory 400 stores instructions for the compromised CA detection logic 62, as well as the telemetry data from edge and other devices shown at 64 and the aforementioned certificate database 66.

To summarize, presented herein are a system and method that use real-time telemetry data containing a certificate and hash of a certificate. Analysis is performed to capture abnormal certificates which lead to identifying a compromised CA. An abnormal certificate is identified by checking against established CN-Certificate mappings composed by previous received reports.

This process is deterministic because of the collaborative knowledge obtained from numerous received telemetry reports. Moreover, this process is dynamic and able to detect a compromised CA when a fake certificate is first used. The scope of the Central Intelligence subsystem is flexible, and can be global or limited to a country or region.

In summary, in one form, a computer-implemented method is provided comprising: receiving over time reports containing data describing certificate authority certificates captured from messages exchanged between clients and servers; storing metadata and statistics for certificates contained in the reports; and determining whether a certificate authority has been compromised based on the metadata and statistics.

In another form, an apparatus is provided comprising a network interface unit configured to enable communications over a network; a memory; a processor coupled to the network interface unit and the memory, wherein the processor is configured to: receive over time reports containing data describing certificate authority certificates captured from messages exchanged between clients and servers; store in the memory metadata and statistics for certificates contained in the reports; and determine whether a certificate authority has been compromised based on the metadata and statistics.

In yet another form, one or more non-transitory computer readable storage media are provided encoded with instructions that, when executed by a processor, cause the processor to: receive over time reports containing data describing certificate authority certificates captured from messages exchanged between clients and servers; store in a memory metadata and statistics for certificates contained in the reports; and determine whether a certificate authority has been compromised based on the metadata and statistics.

In still another form, a system is provided comprising a computing apparatus and a plurality of network devices configured to monitor handshake messages between clients and servers, wherein the computing apparatus is configured to: receive over time reports containing data describing certificate authority certificates captured from messages exchanged between clients and servers; store in a memory metadata and statistics for certificates contained in the reports; and determine whether certificate authority has been compromised based on the metadata and statistics.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
receiving over time reports containing data describing certificate authority certificates captured from messages exchanged between clients and servers;
storing metadata and statistics for certificates contained in the reports, wherein the metadata includes, for each certificate, an issuer of the certificate and an indication of whether or not the certificate has been verified by a central authority, and wherein the statistics include, for each certificate, a date first reported, number of reports received, and time and geographical distribution of reports received;
determining whether a certificate authority has been compromised based on the metadata and the statistics; and
if it is determined that the certificate authority has been compromised, sending to one or more network devices an indication that the certificate authority has been compromised.

2. The method of claim 1, wherein determining comprises determining that a particular certificate authority that issued a particular certificate has been compromised upon determining that the particular certificate uses a Common Name or Domain Name System (DNS) name that has appeared in numerous received reports for the certificates issued by different certificate authorities.

3. The method of claim 1, wherein determining comprises analyzing the metadata and statistics for the certificates contained in the reports to develop a normal activity pattern for a particular certificate, and generating an indication that a particular certificate authority that issued the particular certificate has been compromised when a deviation from the normal activity pattern for the particular certificate is detected.

4. The method of claim 1, wherein storing further comprises storing, in association with a given certificate, information indicating where in a domain name hierarchy the given certificate is detected.

5. The method of claim 1, wherein receiving comprises receiving the reports from a plurality of network devices that monitor handshake messages between the clients and the servers.

6. The method of claim 1, wherein receiving comprises receiving the reports from the clients and/or the servers.

7. The method of claim 1, wherein receiving comprises receiving the reports for a localized geographical region or receiving the reports globally.

8. An apparatus comprising:
a network interface unit configured to enable communications over a network;
a memory;
a processor coupled to the network interface unit and the memory, wherein the processor is configured to:
receive over time reports containing data describing certificate authority certificates captured from messages exchanged between clients and servers;
store in the memory metadata and statistics for certificates contained in the reports, wherein the metadata includes, for each certificate, an issuer of the certificate and an indication of whether or not the certificate has been verified by a central authority, and wherein the statistics include, for each certificate, a date first reported, number of reports received and time and geographical distribution of reports received;

determine whether a certificate authority has been compromised based on the metadata and the statistics; and if it is determined that the certificate authority has been compromised, send to one or more network devices an indication that the certificate authority has been compromised.

9. The apparatus of claim 8, wherein the processor is configured to determine by determining that a particular certificate authority that issued a particular certificate has been compromised upon determining that the particular certificate uses a Common Name or Domain Name System (DNS) name that has appeared in numerous received reports for the certificates issued by different certificate authorities.

10. The apparatus of claim 8, wherein the processor is configured to determine by analyzing the metadata and statistics for the certificates contained in the reports to develop a normal activity pattern for a particular certificate, and generating an indication that a particular certificate authority that issued the particular certificate has been compromised when a deviation from the normal activity pattern for the particular certificate is detected.

11. The apparatus of claim 8, wherein the processor is configured to store, in association with a given certificate, information indicating where in a domain name hierarchy the given certificate is detected.

12. The apparatus of claim 8, wherein the processor is configured to receive the reports from a plurality of network devices that monitor handshake messages between the clients and the servers.

13. The apparatus of claim 8, wherein the processor is configured to receive the reports for a localized geographical region or to receive the reports globally.

14. One or more non-transitory computer readable storage media encoded with instructions that, when executed by a processor, cause the processor to:

receive over time reports containing data describing certificate authority certificates captured from messages exchanged between clients and servers;

store in a memory metadata and statistics for certificates contained in the reports, wherein the metadata includes, for each certificate, an issuer of the certificate and an indication of whether or not the certificate has been verified by a central authority, and wherein the statistics include, for each certificate, a date first reported, number of reports received, and time and geographical distribution of reports received;

determine whether a certificate authority has been compromised based on the metadata and the statistics; and if it is determined that the certificate authority has been compromised, send to one or more network devices an indication that the certificate authority has been compromised.

15. The non-transitory computer readable storage media of claim 14, wherein the instructions operable to determine comprise instructions operable to determine that a particular certificate authority that issued a particular certificate has been compromised upon determining that the particular certificate uses a Common Name or Domain Name System (DNS) name that has appeared in numerous received reports for the certificates issued by different certificate authorities.

16. The non-transitory computer readable storage media of claim 14, wherein the instructions operable to determine comprise instructions operable to analyze the metadata and statistics for the certificates contained in the reports to develop a normal activity pattern for a particular certificate, and generate an indication that a particular certificate authority that issued the particular certificate has been compromised when a deviation from the normal activity pattern for the particular certificate is detected.

17. The non-transitory computer readable storage media of claim 14, wherein the instructions operable to store comprise instructions operable to store, in association with a given certificate, information indicating where in a domain name hierarchy the given certificate is detected.

18. The non-transitory computer readable storage media of claim 14, wherein the instructions operable to receive comprise instructions operable to receive the reports from a plurality of network devices that monitor handshake messages between the clients and the servers.

19. The non-transitory computer readable storage media of claim 14, wherein the instructions operable to receive comprises instruction operable to receive the reports from the clients and/or the servers.

20. The non-transitory computer readable storage media of claim 14, wherein the instructions operable to receive comprise instruction operable to receive the reports for a localized geographical region or to receive the reports globally.

\* \* \* \* \*